United States Patent
Huang et al.

(10) Patent No.: US 8,978,000 B2
(45) Date of Patent: Mar. 10, 2015

(54) PERFORMANCE-DRIVEN AND GRADIENT-AWARE DUMMY INSERTION FOR GRADIENT-SENSITIVE ARRAY

(71) Applicant: Taiwan Semiconductor Manufacturing Co. Ltd., Hsin-Chu (TW)

(72) Inventors: Mu-Jen Huang, Taipei (TW); Hsiao-Hui Chen, Hsinchu (TW); Cheok-Kei Lei, Andar AC (MO); Po-Tsun Chen, Taichung (TW); Yu-Sian Jiang, Kaohsiung (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 0 days.

(21) Appl. No.: 13/727,691

(22) Filed: Dec. 27, 2012

(65) Prior Publication Data
US 2014/0189625 A1 Jul. 3, 2014

(51) Int. Cl.
G06F 9/455 (2006.01)
G06F 17/50 (2006.01)
H01L 27/02 (2006.01)
G03F 1/00 (2012.01)

(52) U.S. Cl.
CPC ........ *G06F 17/5081* (2013.01); *H01L 27/0207* (2013.01); *G03F 1/144* (2013.01); *G06F 17/5068* (2013.01); *G06F 2217/12* (2013.01)
USPC ............................. 716/111; 716/118; 716/119

(58) Field of Classification Search
USPC ......................................................... 716/111
See application file for complete search history.

(56) References Cited

U.S. PATENT DOCUMENTS

| | | | |
|---|---|---|---|
| 6,407,434 B1 | 6/2002 | Rostoker et al. | |
| 7,774,726 B2 | 8/2010 | White | |
| 7,962,867 B2 | 6/2011 | White et al. | |
| 8,001,516 B2 | 8/2011 | Smith et al. | |
| 2003/0040175 A1 | 2/2003 | Deliwala | |
| 2005/0044522 A1* | 2/2005 | Maeda | 716/18 |

(Continued)

OTHER PUBLICATIONS

Notice of Allowance Dated Feb. 21, 2014 U.S. Appl. No. 13/744,532.
(Continued)

*Primary Examiner* — Paul Dinh
*Assistant Examiner* — Bryce Aisaka
(74) *Attorney, Agent, or Firm* — Eschweiler & Associates, LLC

(57) ABSTRACT

The present disclosure relates to an arrangement and a method of performance-aware buffer zone placement for a high-density array of unit cells. A first feature density of the array is measured and maximum variation for a parameter within a unit cell is determined. A look-up table of silicon data is consulted to predict a buffer zone width and gradient value that achieves a variation that is less than the maximum variation for the unit cell. The look-up table contains a suite of silicon test cases of various array and buffer zone geometries, wherein variation of the parameter within a respective test structure is measured and cataloged for the various buffer zone geometries, and is also extrapolated from the suite of silicon test cases. A buffer zone is placed at the border of the array with a width that is less than or equal to the buffer zone width.

20 Claims, 11 Drawing Sheets

(56) References Cited

U.S. PATENT DOCUMENTS

| | | |
|---|---|---|
| 2005/0058416 A1 | 3/2005 | Hoon Lee et al. |
| 2005/0085932 A1 | 4/2005 | Aghababazadeh et al. |
| 2007/0101305 A1* | 5/2007 | Smith et al. ............ 716/8 |
| 2008/0135095 A1 | 6/2008 | Cummings et al. |
| 2008/0213957 A1 | 9/2008 | Balakrishnan |
| 2009/0193374 A1 | 7/2009 | Fujimoto et al. |
| 2010/0221846 A1 | 9/2010 | Widdershoven |
| 2011/0047520 A1* | 2/2011 | Chew et al. ............ 716/52 |

OTHER PUBLICATIONS

U.S. Appl. No. 13/744,532, filed Jan. 18, 2013.
U.S. Appl. No. 13/745,913, filed Jan. 21, 2013.
Office Action Dated Apr. 10, 2014 U.S. Appl. No. 13/745,913.
Notice of Allowance Dated Aug. 19, 2014 U.S. Appl. No. 13/745,913.
U.S. Appl. No. 14/578,690 filed Dec. 22, 2014.

* cited by examiner

100B

| PO.DN of MOS Array (102B) | PO.DN Gradient (104B) | Distance (106B) | Standard Variation (108B) |
|---|---|---|---|
| 65% | 40% | 15 μm | 4.63% |
| 65% | 40% | 25 μm | 1.79% |
| 65% | 40% | 35 μm | 1.32% |

200A

| PO.DN of MOS Array (202A) | PO.DN Gradient (204A) | Distance (206A) | Standard Variation (208A) |
|---|---|---|---|
| 65% | 10% | 15 μm | 1.16% |
| 65% | 40% | 15 μm | 4.63% |
| 65% | 40% | 25 μm | 1.79% |
| 65% | 40% | 35 μm | 1.32% |

PERFORMANCE-DRIVEN AND GRADIENT-AWARE DUMMY INSERTION FOR GRADIENT-SENSITIVE ARRAY

BACKGROUND

Semiconductor manufacturing utilizes processing steps such as patterning through lithography, various methods of layer deposition and removal, and thermal cycling, etc. All of these processes can degrade electrical properties of a device formed by the processing steps. Chemical-mechanical planarization (CMP) is a method of layer removal which relies on pattern uniformity within the layer. To enhance pattern uniformity and avoid associated performance degradation for an array of devices, dummy cell insertion is utilized within unused space residing between active devices within a region of the array by an automated cell insertion routine or other means. As device sizes shrink through node-to-node scaling, the relative contribution of to the performance degradation resulting from CMP and other pattern uniformity dependent processing steps increases. Matching of device parametrics between analog devices located in different regions of a circuit layout must be considered when modeling function of a circuit design to insure correct behavior of a manufactured semiconductor circuit.

BRIEF DESCRIPTION OF THE DRAWINGS

FIGS. 2C-2E illustrate some embodiments of buffer zone placement at a border of an array.

DETAILED DESCRIPTION

Figure 1A:
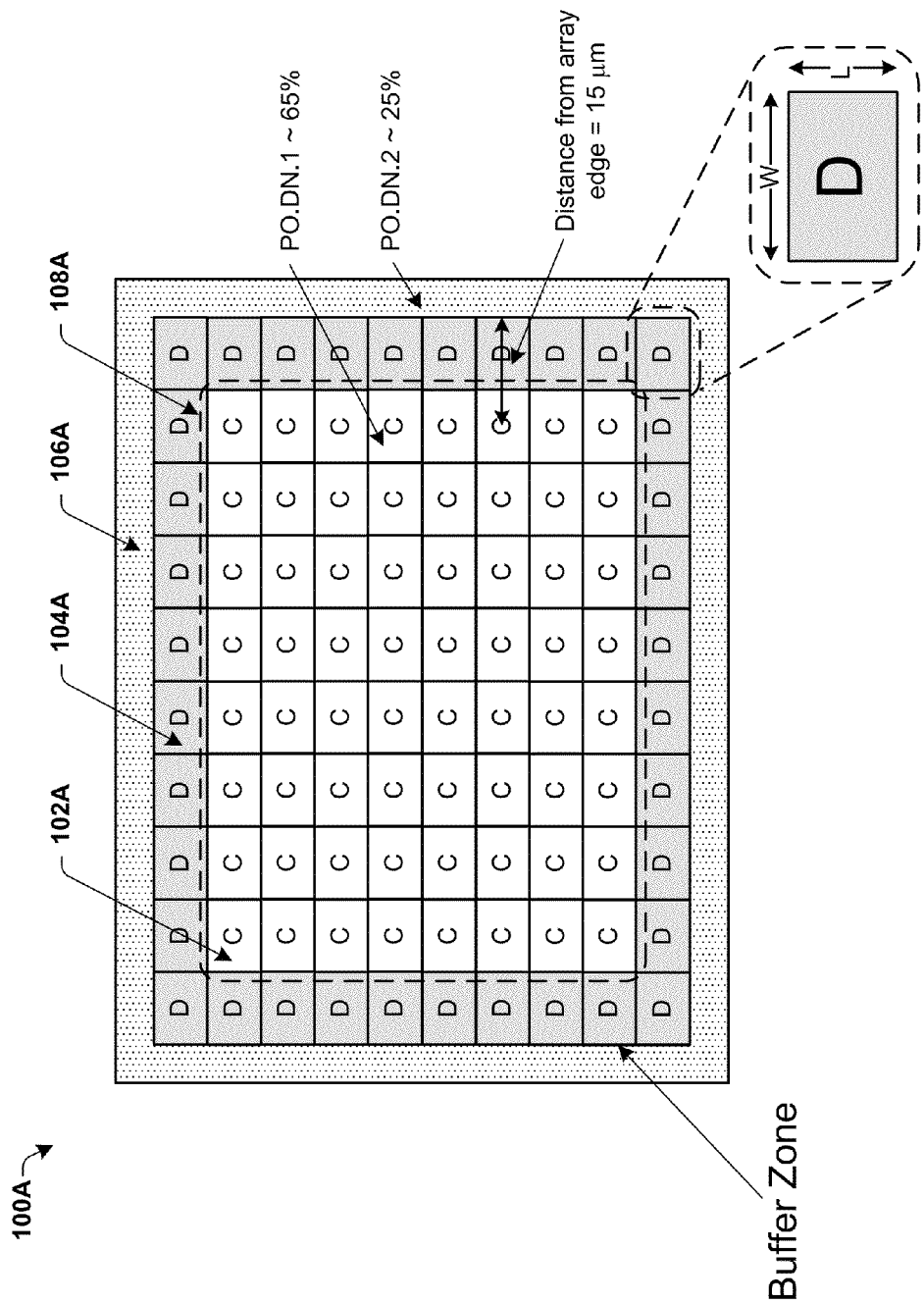
FIG. 1A illustrates a semiconductor device array of unit cells with a buffer zone of dummy unit cells.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

FIG. 1A illustrates a semiconductor device array 100A of a plurality unit cells (C) 102A with a buffer zone comprising a plurality of dummy unit cells (D) 104A separating the semiconductor device array 100A from surrounding region 106A. In advanced technology node manufacturing such as Node-28 (n28) or Node-20 (n20) utilizing high-k metal gate (HKMG) complementary metal-oxide-semiconductor (CMOS) manufacturing processes, a gradient in density of polycrystalline silicon (poly) material commonly used as a gate contact for CMOS devices formed within the semiconductor device array 100A and the surrounding region 106A can affect circuit performance of the CMOS devices resulting from a mismatch in analog device geometries and resulting electrical parametrics. Moreover, the mismatch increases as a value of the density gradient increases, further degrading circuit performance. To reduce the analog device mismatch for the semiconductor device array 100A, layout guidelines suggests a designer surround a core device array 108A with the buffer zone of dummy unit cells (D) 104A. However, the layout guidelines provide no information to correlate the electrical parametrics of an analog device to a specific buffer zone geometry in order to quantify the effects of the buffer zone on the semiconductor device array 100A, particularly for unit cells (C) 102A located at an edge of the core active device array 108A.

In the following non-limiting example, the semiconductor device array 100A comprises a design under test (DUT) further comprising a 10×10 array of cells, cells further comprising the unit cells (C) 102A and the dummy unit cells (D) 104A, wherein the dummy unit cell 104A comprises physical layout topologies which are identical to those of the unit cell 102A, but not electrically active. Both the unit cell 102A and the dummy unit cell 104A comprise a width (W) of approximately 10 µm and a length (L) of approximately 7 µm. The semiconductor device array 100A comprises a first gate poly feature density of approximately 65% (PO.DN.1~65%), and surrounding region 106A comprises a second gate poly feature density of approximately 25% (PO.DN.2~25%). The surrounding region 106A is formed by an automated fill utility performed at a chip level of hierarchy of a physical design, which results in a density gradient between PO.DN.1 and PO.DN.2 of approximately 40% across an edge of the semiconductor device array 100A.

Figures 1B, 1C:
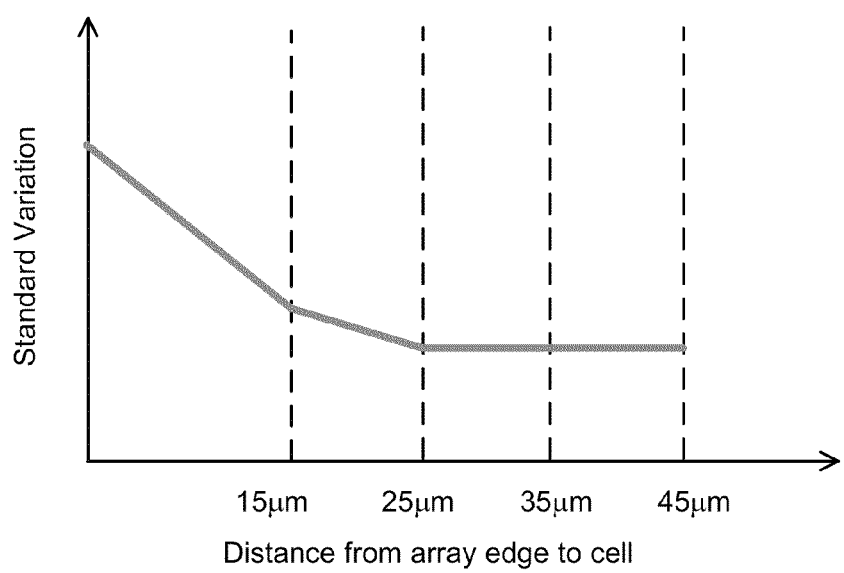
FIG. 1B-1C illustrate variation of a parameter within the array as a function of gradient.

FIG. 1B illustrates a table of silicon data 100B demonstrating average variation of electrical current 108B within the semiconductor device array 100A as a function of a density gradient 104B between PO.DN.1 102B and PO.DN.2 for various distances 106B from an edge of the semiconductor device array 100A. For unit cells 102A located at a (center) distance 106B of approximately 15 µm from an edge of the semiconductor device array 100A (i.e., unit cells 102A at the edge of the core device array 108A), the variation in electrical current 108B measured across the unit cells 102A is approximately 4.63%. Increasing the distance 106B to approximately 25 µm (i.e., the next row of unit cells 102A in from the edge of core device array 108A) decreases the variation in electrical current 108B to approximately 1.79%. Further increasing the distance 106B to approximately 35 µm further decreases the variation in electrical current 108B to approximately 1.32%. Therefore, if a designer desires a variation in electrical current 108B of less than approximately 1.32%, then the designer would be advised to keep utilize unit cells 102A at a distance of greater than or equal to approximately 35 µm from the semiconductor device array 100A. Equivalently, the design could widen the buffer zone to approximately 30 µm by adding add two additional "rings" of dummy unit cells (D) 104A. The table of silicon data 100B is equivalently represented by a plot 100C of standard variation (i.e., variation in electrical current 108B) of a unit cell (102A) as a function of distance (106B) from the edge of the semiconductor device array 100A, as illustrated in FIG. 1C.

Accordingly, the present disclosure relates to an arrangement and a method of performance-aware buffer zone placement for a high-density array of unit cells. A first feature density of the array is measured and maximum variation for a parameter within a unit cell is determined. A look-up table of silicon data is consulted to predict a buffer zone width and gradient value that achieves a variation that is less than the maximum variation for the unit cell. The look-up table contains a suite of silicon test cases of various array and buffer zone geometries, wherein variation of the parameter within a respective test structure is measured and cataloged for the various buffer zone geometries, and is also extrapolated or interpolated from the suite of silicon test cases. A buffer zone is placed at the border of the array with a width that is less than or equal to the buffer zone width. Some embodiments of the present disclosure allow a designer to consider edge effects and current variation for devices formed within an array at the cell level of design hierarchy, and to develop a performance driven dummy insertion methodology based on silicon-data of test structures. Identical and graded identical dummy cells smooth a density gradient between the array and an outer low-density region in cell design stage of chip design, saving redesign rework at a downstream stage of the design flow. This allows for a real-time edge effect analysis for a gradient-sensitive array of CMOS devices formed in a semiconductor manufacturing process, a reduction in iteration between design and silicon hardware, and improve circuit performance by refining model to hardware correlation.

Figures 2A, 2B:
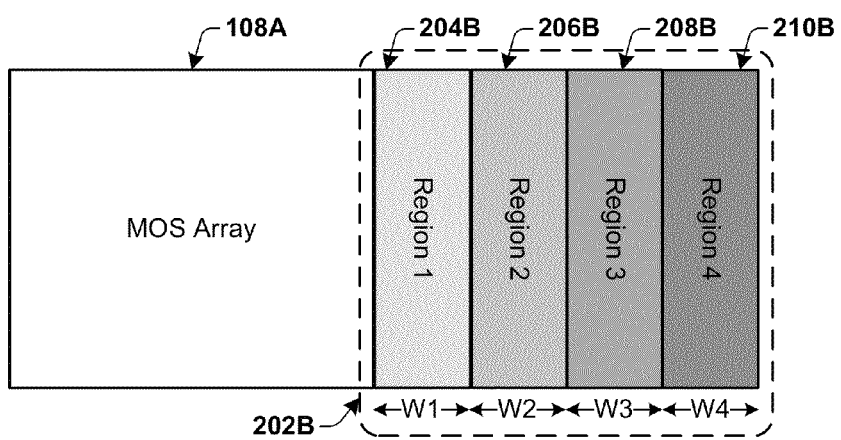
FIG. 2A illustrates some embodiments of a look-up table of parameter variation for an array of unit cells.
FIG. 2B illustrates some embodiments of a buffer zone architecture comprising an array abutting a buffer zone which is segregated into a plurality of regions.

FIG. 2A illustrates some embodiments of a look-up table (LUT) 200A of parameter variation for an array of unit cells. The LUT 200A is compiled from a suite of silicon test cases comprising various array and buffer zone geometries, wherein the variation of the parameter 208A (e.g., current, resistance, etc.) of a unit cell within a respective test structure is measured and cataloged for various buffer zone geometries comprising various feature densities 202A, various density gradient 204A, various distances from an array edge 206A. In some embodiments of LUT 200A, variation of the parameter is extrapolated or interpolated from two or more silicon test cases comprising portions of physical layout topographies (e.g., an array of a first layout combined with a buffer zone of a second layout, etc.).

FIG. 2B illustrates some embodiments of a buffer zone architecture 200B comprising an MOS array 108A abutting a buffer zone 202B. The MOS array 108A comprises a first feature density (i.e., 202A of LUT 200A). The buffer zone 202B is segregated into a plurality of regions 204B-210B comprising a first region 204B further comprising the first feature density, a second region 206B further comprising a second feature density which is approximately equal to a difference between the first feature density and a density gradient 204A of LUT 200A, a third region 208B further comprising a third feature density which is approximately equal to a difference between the second feature density and a density gradient 204A of LUT 200A, and a fourth region 210B further comprising a fourth feature density which is approximately equal to a difference between the third feature density and a density gradient 204A of LUT 200A. For a fixed feature density 202A, the second feature density, third feature density, and fourth feature density may be systematically adjusted based on a value of the density gradient 204A, as well as a width W1-W4 of a first through fourth region, respectively.

Figures 2C, 2D:
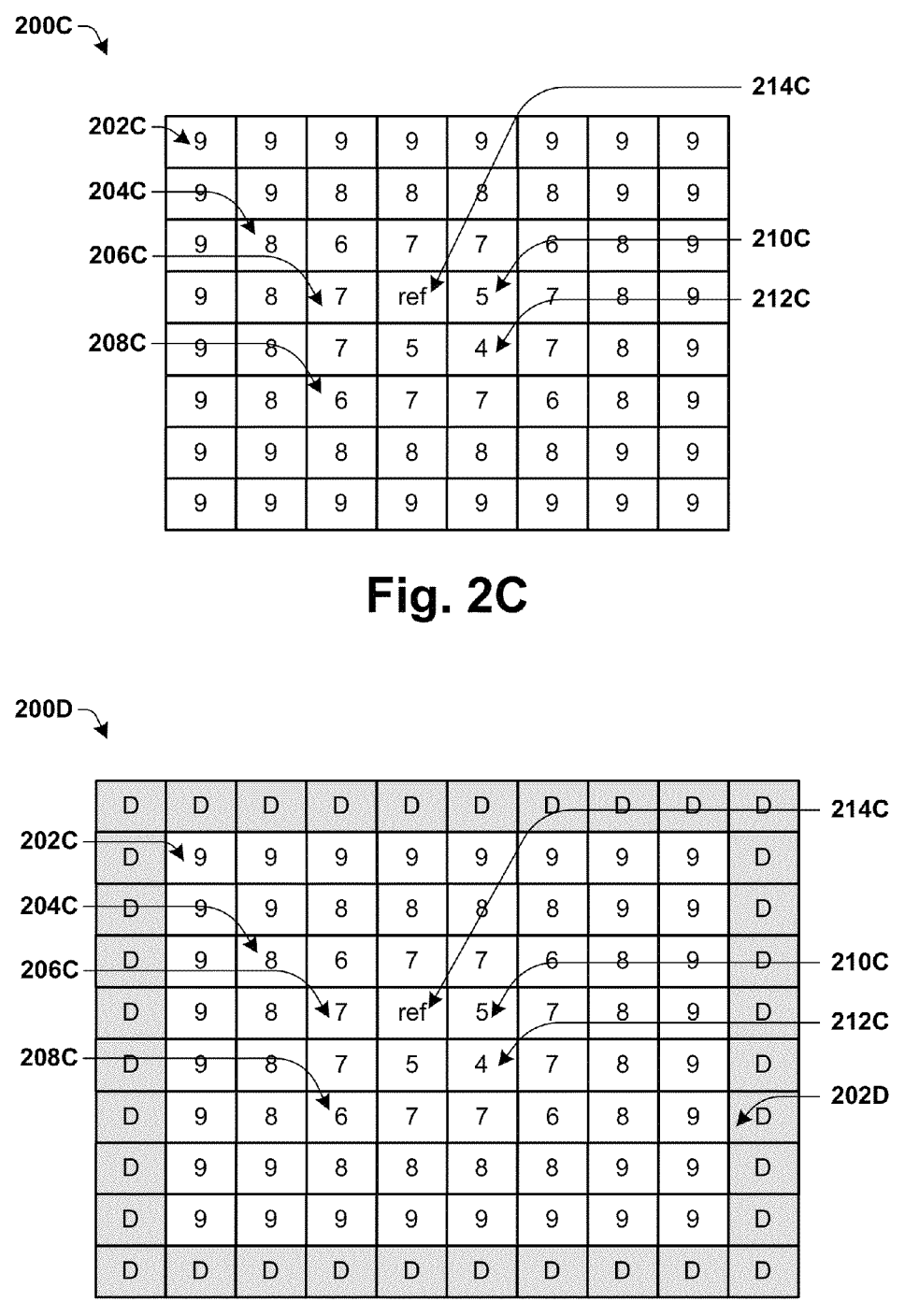

FIG. 2C illustrates some embodiments an array 200C comprising an 8×8 matrix of unit cells 202C-214C segregated into various groupings, groupings comprising edge unit cells 202C (i.e., cells "9") comprising an outer ring, inner edge cells 204C (i.e., cells "8") comprising an inner ring, first near center cells 206C (i.e., cells "7"), second near center cells 208C (i.e., cells "6"), first center cells 210C (i.e., cells "5"), second center cells 212C (i.e., cells "4"), and a reference cell. Note that unit cells 202C-214C comprise identical physical layout topographies and are only distinguished by their respective locations. For some embodiments of the LUT 200A, the parameter 208A comprises a mean current mismatch between a respective group of unit cells and remaining groups in the array, normalized by a weighting factor. For instance, a current mismatch for edge unit cells 202C is defined as $$\frac{\text{(Total current of outer ring)} - \text{Total current of remaining cells}}{\text{Average current of cells not in outer ring}}.$$

FIG. 2D comprises some embodiments of the array 200C, wherein a "dummy ring" or first region surrounding the array 200C and comprising a plurality of dummy cells (D) 202D, wherein a respective dummy cell 202D comprises dummy physical layout topologies which are identical physical layout topologies of a unit cell 202C-214C, but not electrically active. The first region further comprises the first feature density.

Figure 2E:
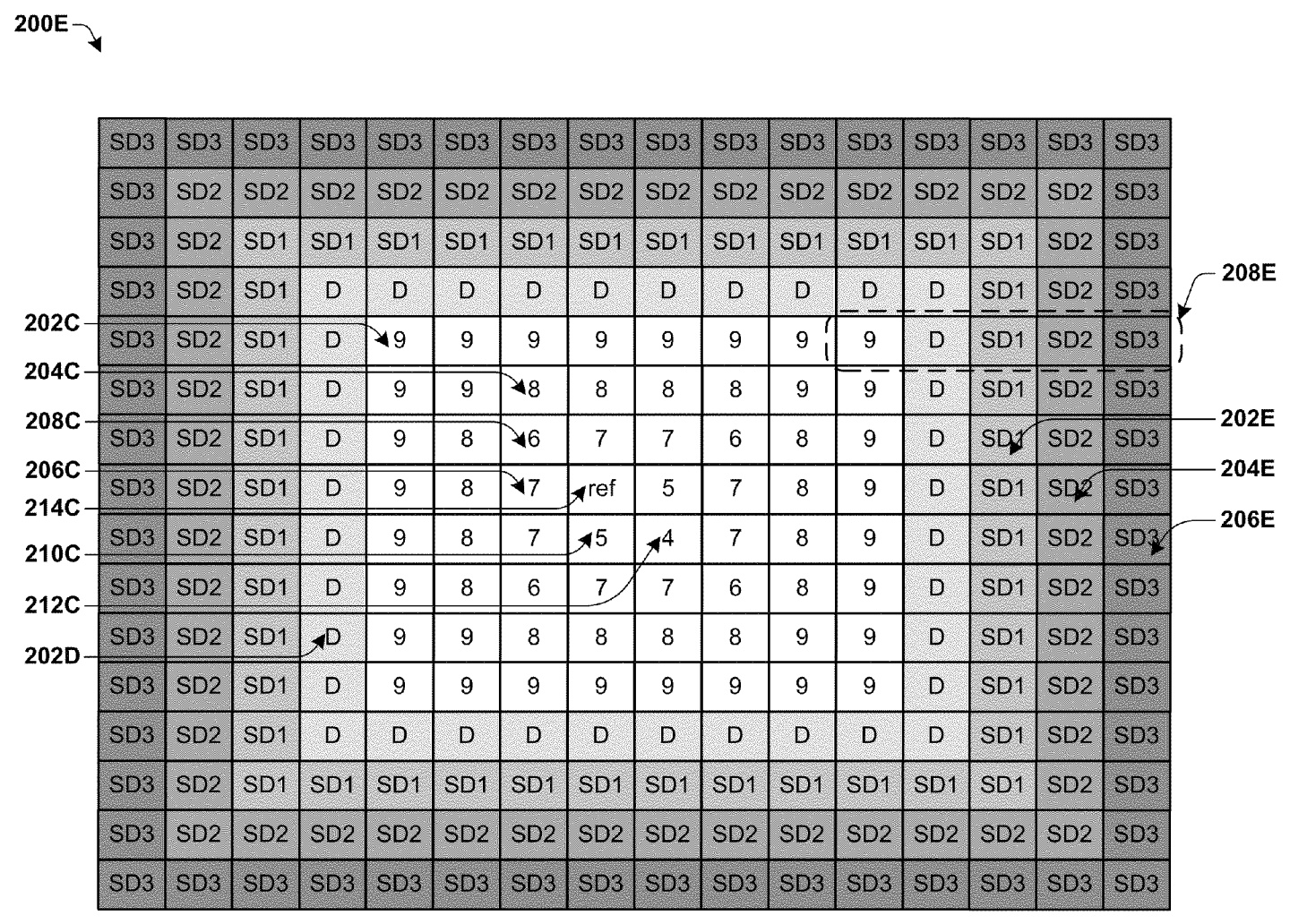

FIG. 2E illustrates some embodiments of buffer zone placement 200E at a border of the array 200C, wherein the buffer zone comprises the first comprising the plurality of dummy cells (D) 202D of FIG. 2D. The buffer zone further comprises a second region bordering the first region and comprising a plurality of first graded density dummy cells (SD1) 202E, wherein a respective first graded density dummy cell 202E further comprises a second feature density that is approximately equal to a difference between the first feature density and the density gradient 204A. The buffer zone further comprises a third region bordering the second region and comprising a plurality of second graded density dummy cells (SD2) 204E, wherein a respective second graded density dummy cell 204E further comprises a third feature density that is approximately equal to a difference between the second feature density and the density gradient 204A. The buffer zone further comprises a fourth region bordering the third region and comprising a plurality of third graded density dummy cells (SD3) 206E, wherein a respective third graded density dummy cell 206E further comprises a fourth feature density which is determined in an analogous fashion to the second feature density and the third feature density.

Figure 3:
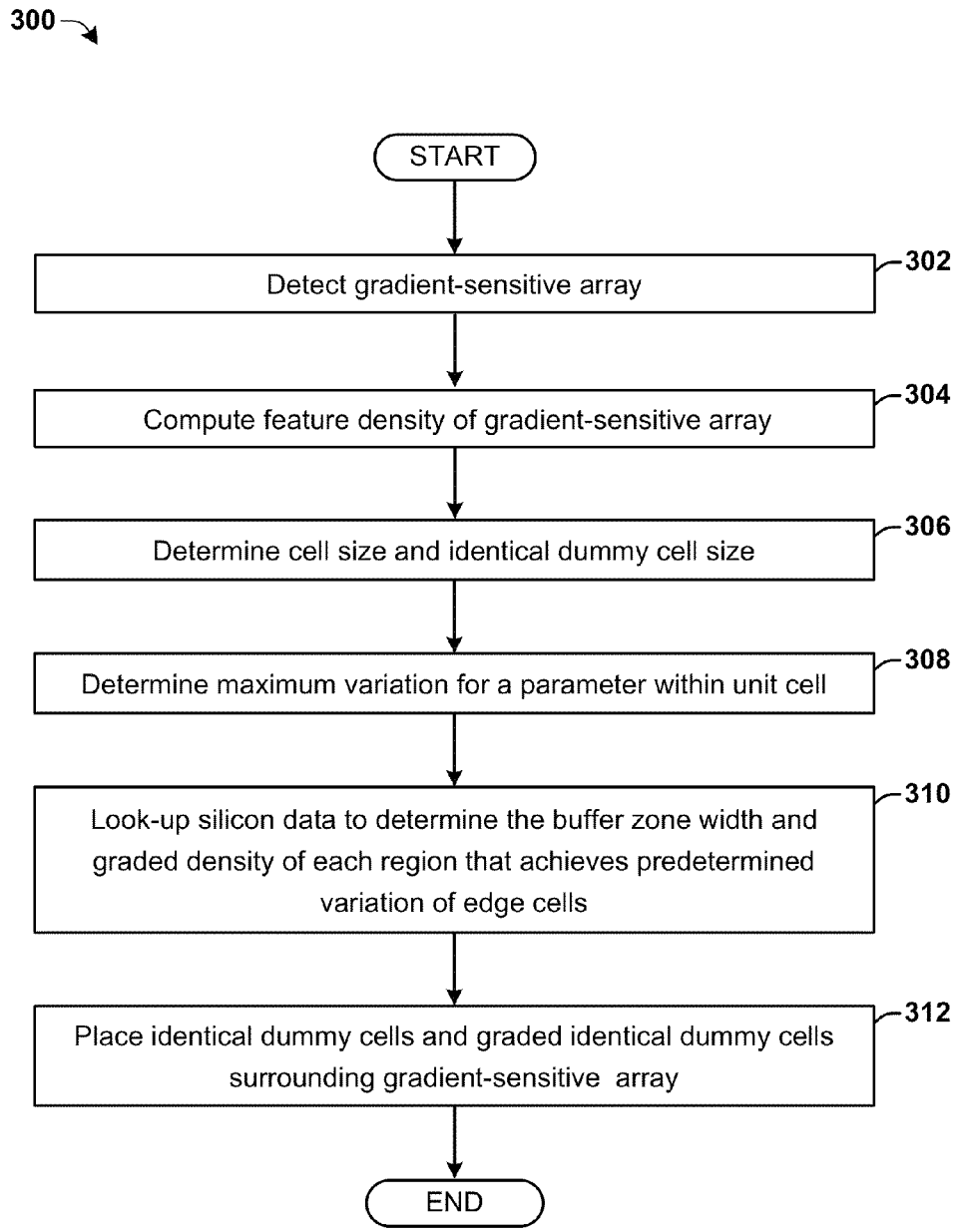
FIG. 3 illustrates some embodiments of a method of performance-aware cell insertion within a buffer zone bordering a device array.

FIG. 3 illustrates some embodiments of a method 300 of performance-aware dummy cell insertion within a buffer zone bordering a device array. While method 300 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 302 silicon data is imported into a design tool and an array comprising a plurality of unit cells is detected, wherein a respective unit cell comprises physical layout topologies, and wherein the array further comprises a first feature density.

At 304 the first feature density of the array is measured by the design tool. In some embodiments the first feature density comprises a first poly feature density (PO.DN.1). In some embodiments the first feature density comprises a first diffusion feature density (OD.DN.1) of an oxide definition layer from which a source and drain of a CMOS transistor is derived.

At 306 a cell size for a respective unit cell is measured to determine sizes for one or more regions of a buffer zone comprising dummy cells and graded density dummy cells, wherein the dummy cells and graded density dummy cells comprise the cell size in some embodiments.

At 308 a maximum variation for a parameter of the respective unit cell is determined, wherein the parameter comprises an electrical parameter (e.g., current, resistance, etc.) that modeled by simulation software before and after placement of the buffer zone.

At 310 a look-up table (LUT) of silicon data is consulted in order to predict a buffer zone width that achieves a variation of the parameter that is less than the maximum variation for the respective unit cell.

At 312 a buffer zone comprising the width that is less than or equal to the buffer zone width is disposed at a border of the array. In some embodiments, the buffer zone is further segregated into plurality of regions, wherein a density gradient value is defined between a respective pair of regions that achieves the variation less than the maximum variation. In some embodiments the width of each region comprises the cell size. In some embodiments the widths of one or more regions of the buffer zone is adjusted to achieve the variation less than the maximum variation.

Figure 4A:
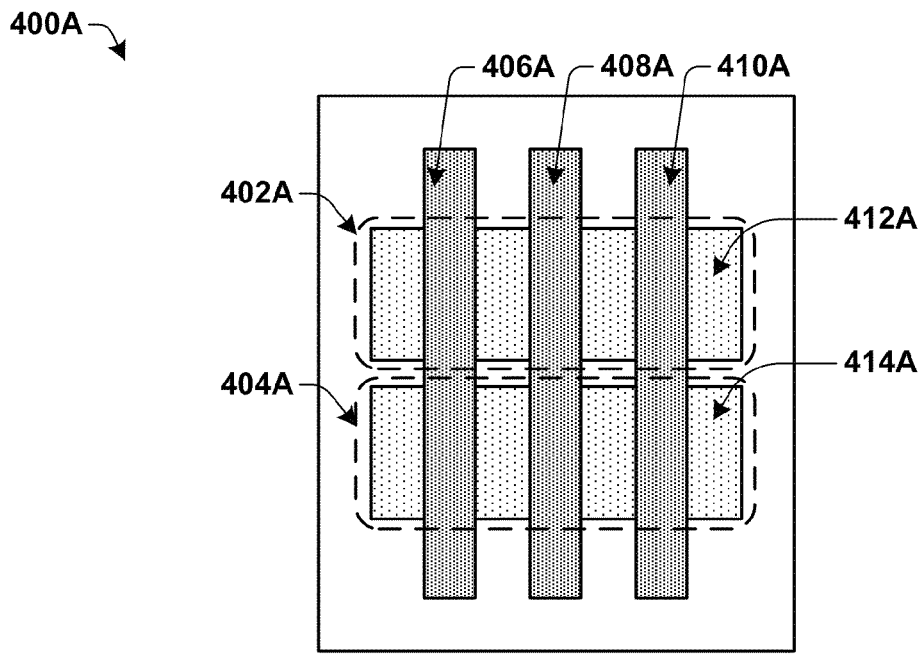
FIGS. 4A-4C illustrate some embodiments of a parameterized cell configured to vary layout parameters comprising dimensions of a layout feature to produce a desired feature density value for the parameterized cell.

FIG. 4A illustrates some embodiments of an identical dummy cell 400A, comprising a CMOS field-effect transistor (FET) 402A and a second CMOS FET 404A, further comprising physical layout topologies comprising a first gate poly 406A, a second gate poly 408A, a third gate poly 410A, a first diffusion 412A, and a second diffusion 414A. In some embodiments, the physical layout topologies of identical dummy cell 400A are identical to those of a unit cell 202C-214C of the array 200C.

Figure 4B:
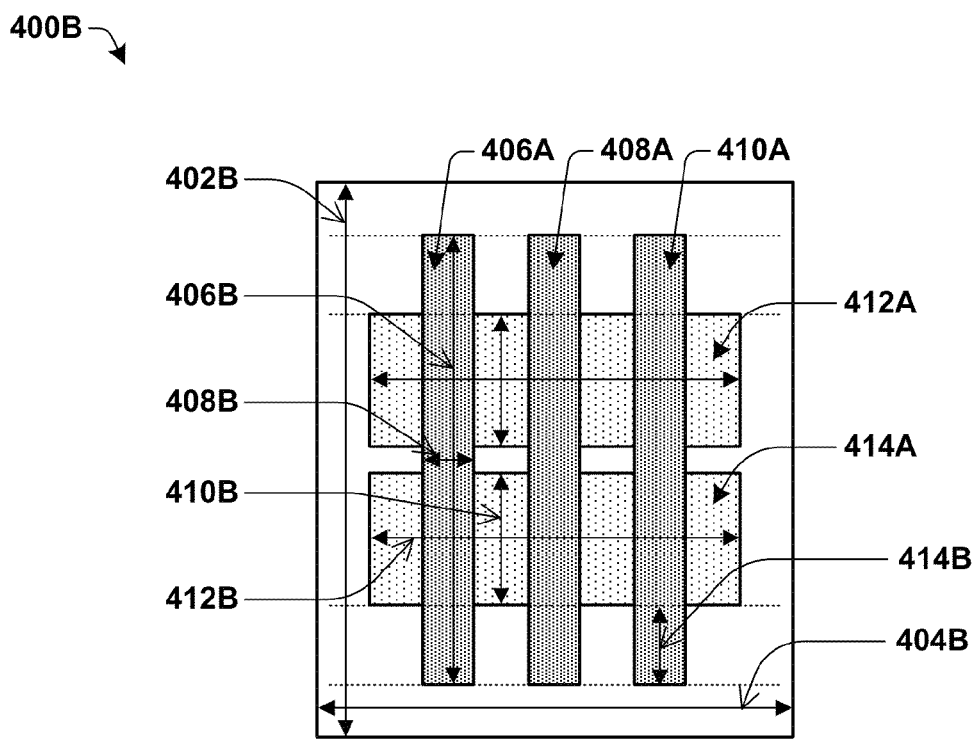

FIG. 4B illustrates some embodiments of a parameterized cell (pcell) 400B configured to vary layout parameters of the physical layout topologies of the embodiments of FIG. 4A, layout parameters comprising cell height 402B, cell width 404B, poly height 406B, poly width 408B, diffusion length 410B, and diffusion width 412B. The aforementioned layout parameters varied in combination may also result in a systematic variation of a poly overhang (extension) 414B past diffusion to improve variation of electrical parameters associated with a gate definition.

Figure 4C:
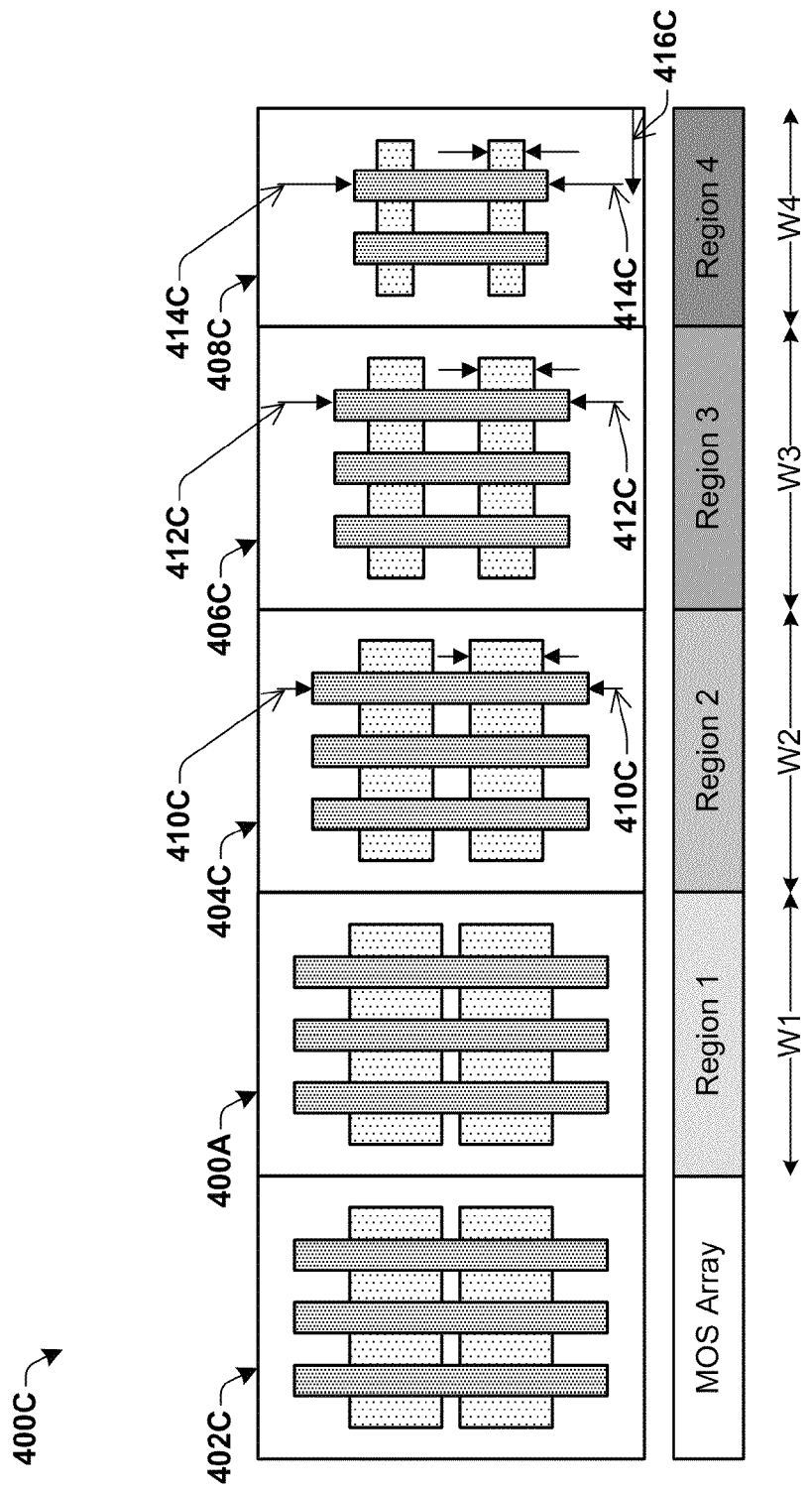

FIG. 4C illustrates some embodiments of a buffer zone architecture 400C into a plurality of regions (Region 1-Region 4), comprising a unit cell 402C, and identical dummy cell 400A, and a plurality of instances 404C-408C of pcell 400B, wherein layout parameters comprising dimensions of a layout feature further comprising the physical layout topologies within a respective instance 404C-408C are varied to produce a desired feature density value for the respective instance 404C-408C of the pcell 400B, as well as a density gradient between adjacent regions. A width W1-W4 of the first through fourth regions, respectively, is approximately equal to a single cell width 404B of a pcell instance. The first region is defined to border an edge of an array (MOS) and comprises a plurality of identical dummy cells 400A, respective dummy cell 400A further comprising dummy physical layout topologies which are identical physical layout topologies of the unit cell 402C, but not electrically active. The identical dummy cell 400A is configured to comprise a first feature density value which is identical to that of the unit cell 402C, as both comprise identical physical layout topologies. The second region is defined to border an edge of the first region and comprises a plurality of first graded density dummy cells 404C, wherein a respective first graded density dummy cell 404C further comprises a first instance of pcell 400B. The respective first graded density dummy cell 404C further comprises a first graded density layout that comprises the layout topologies of the layout of the unit cell 402C.

In the following non-limiting example, layout guidelines within a Node-28 (n28) technology node may require a density gradient value for PO.DN or OD.DN of less than 10% between the array and first region, or between any two adjacent regions for the buffer zone architecture 400C to achieve a variation less than the maximum variation for unit cell 402C. The first region comprises a first poly feature density (PO.DN.1) of approximately 65%. As is evident, a first poly gradient between MOS array and the first region (Region 1) is zero as both regions comprise identical layout and thus the first poly feature density (PO.DN.1). A second gradient between the first region and a second region (Region 2), a third gradient between the second region and a third region (Region 3), and a fourth gradient between the third region and a fourth region (Region 4) are all required to be less than 10% per the layout guidelines. Therefore, a second poly feature density (PO.DN.2) of the second region is configured to be approximately equal to a difference between the first feature density (PO.DN.1) value of approximately 65% and a density gradient (approximately 10%), or approximately 55%, which is achieved by reducing the poly length (406B) of the first graded density dummy cell 404C instance of pcell 400B by a first poly step size value 410C. Similarly, a third poly feature density (PO.DN.3) of the third region is configured to be approximately 45%, and is achieved by reducing the poly length (406B) of a second graded density dummy cell 406C instance of pcell 400B by a second poly step size value 412C, which is approximately twice a value of the first poly step size value 410C. A fourth poly feature density (PO.DN.4) value of the fourth region is configured to be approximately 35%, and may be achieved by reducing the poly length (406B) of a third graded density dummy cell 408C instance of pcell 400B by a third poly step size value 414C, which is approximately three times the value of the first poly step size value 410C. A PO.DN.4 value of approximately 35% may also be achieved by reducing the cell width (404B) of the third graded density dummy cell 408C and removing the third gate poly 410A of identical dummy cell 400A such that uniformity of poly material is maintained within the buffer zone architecture 400C.

An analysis of required diffusion feature densities (OD.DN.1-OD.DN.4) throughout the various regions of regions for the buffer zone architecture 400C follows similarly. In general, a layout feature of the layout from which a feature density is derived is systematically sized along a length of the layout feature by a first length reduction value or systematically sized along a width of the layout feature by a first width reduction value to achieve the feature density value within a respective region. The layout feature may also be increased in size to increase feature densities throughout the buffer zone architecture 400C. Additionally, a size of a graded density dummy may be reduced or increased, respectively, by removing or adding a periodic structure comprising the layout feature (e.g., a gate poly finger or diffusion block) such that pattern uniformity is maintained within the buffer zone architecture 400C.

Figure 5:
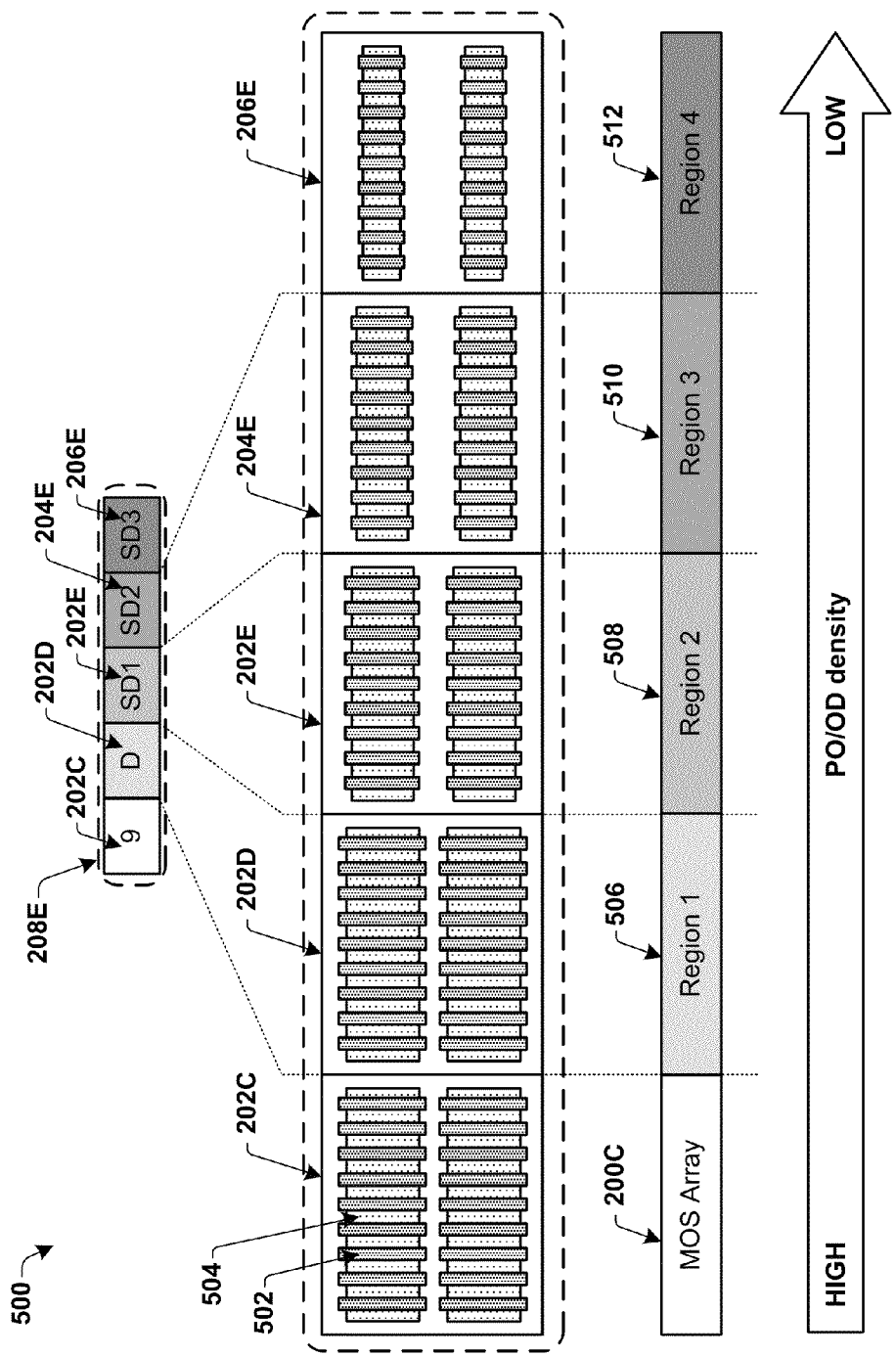
FIG. 5 illustrates some embodiments of graded density dummy cell insertion next to a buffer zone comprising a plurality of regions.

FIG. 5 illustrates some embodiments of graded density dummy cell insertion 500 within a buffer zone cross-section 208E. An edge unit cell 202C at a border of the array 200C comprises first physical layout topologies further comprising a poly (PO) feature 502 and a diffusion (OD) feature 504. The dummy cell 202D within a first region 506 of the buffer zone cross-section 208E comprises second physical layout topologies which are identical to the first physical layout topologies of edge unit cell 202C, and hence no variation in PO feature density or in OD feature density from the edge unit cell 202C. The first graded density dummy cell 202E of the second region 508 comprises a reduction in PO feature density and in OD feature density from the dummy cell 202D by systematically sizing PO feature length and OD feature length down by one level, or 0.2 µm from the dummy cell 202D for the embodiments of FIG. 5. The second graded density dummy cell 204E of the third region 510 comprises a reduction in PO feature density and in OD feature density from the first graded density dummy cell 202E by systematically sizing PO feature length and OD feature length by two levels, or 0.4 µm. The third graded density dummy cell 206E of the fourth region 512 comprises a reduction in PO feature density and in OD feature density from the second graded density dummy cell 204E by systematically sizing PO feature length and OD feature length by three levels, or 0.6 µm.

Utilization of a pcell (400B) to generate a graded identical dummy pattern of the embodiments of FIG. 5 aids pattern uniformity as well as a smooth linear gradient. Utilization of the pcell (400B) also enhances electrical matching within unit cells comprising the array 200C over some prior art approaches comprising dummy fill methodologies further comprising divergent feature geometries from those utilized in active unit cells, and thus disrupts pattern uniformity. Small fill shapes are also subject to unknown post-design processing to guarantee printability, whereas the pcell (400B) mimics physical layout topologies of the active unit cell, which vary systematically in post-design processing, thus maintaining pattern uniformity. Layout data (e.g., oasis, gds, etc.) comprising pcells as buffer cells also reduces file data size over flat, custom designs.

Figure 6:
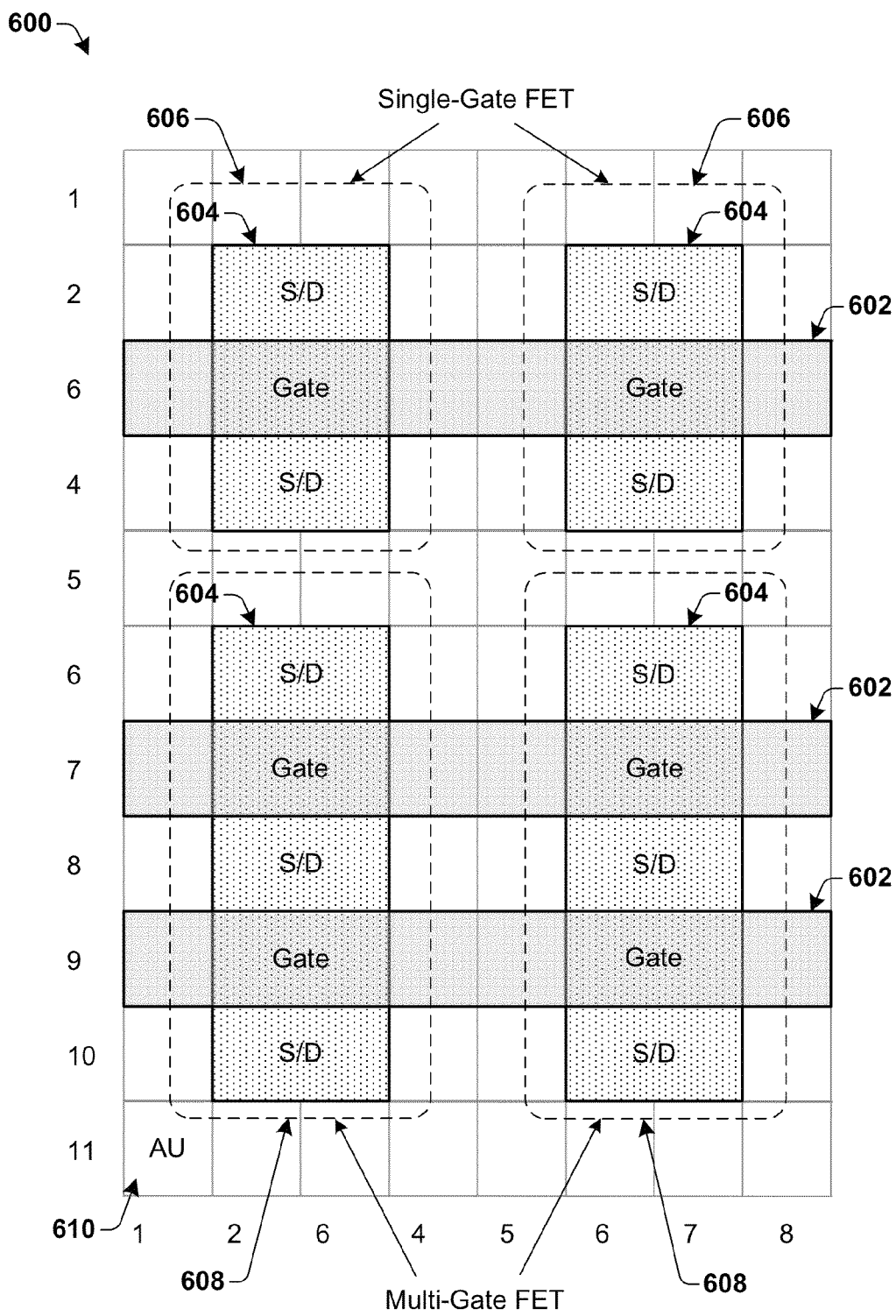
FIG. 6 illustrates some embodiments of transistor layouts for measuring pattern densities.

FIG. 6 illustrates some embodiments of transistor layouts 600 for measuring pattern densities, comprising three gate materials 602 and four active areas 604, which form two single-gate FETs 606 and two multi-gate FETs 608. In the embodiment of FIG. 6 a multi-gate FET 608 comprises two gates. The gate materials 602 and active areas 604 are drawn on a course grid such that each of their two-dimensional areas may be expressed in terms on an area unit (AU) 610. The total layout area for a region of the embodiments of transistor layouts 600 is 8 AU×11 AU=88 AU². The total layout area of the gate materials 602 is 8 AU×1 AU×3=24 AU². The total layout area of the active areas 604 is (2 AU×5 AU×2)+(2 AU×3 AU×2)=32 AU². Therefore, a pattern density may be defined for the gate materials 602 as the total layout area of the gate materials 602 divided by the total layout area for the region of the embodiments of transistor layouts 600=24 AU²/88 AU²=27%. Similarly, a pattern density may be defined for the active areas 604 as 32 AU²/88 AU²=36%. In general a pattern density for shape A may be defined as:

$$\text{Pattern Density of Shape } A = \frac{\text{Total Layout Area of Shape } A}{\text{Total Layout Area}}.$$

Figure 7:
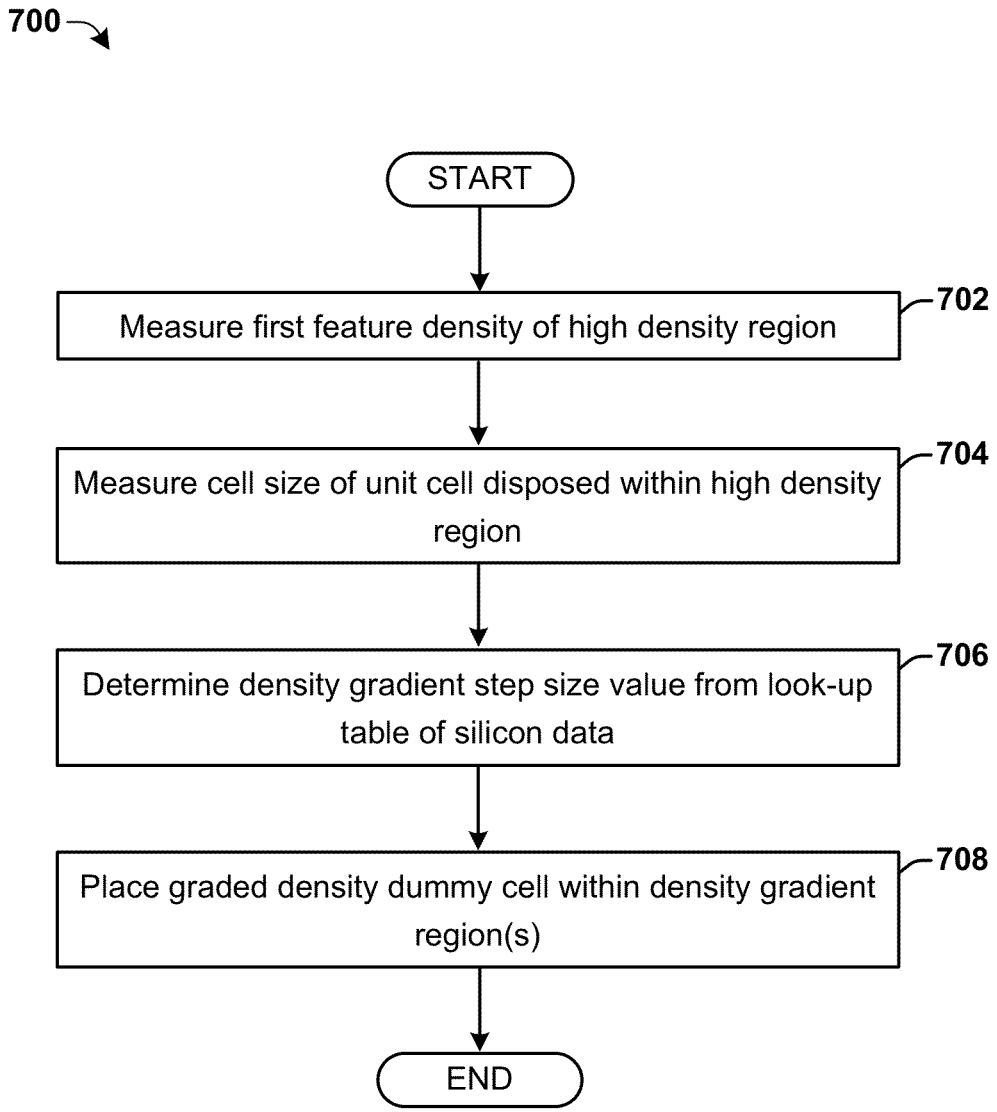
FIG. 7 illustrates some embodiments of a method to define a density gradient within a buffer zone.

FIG. 7 illustrates some embodiments of a method 700 to define a density gradient within a buffer zone. While method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 702 a first feature density of a high-density region comprising a plurality of unit cells within a physical layout is measured.

At 704 a cell size for a unit cell disposed within the high-density region is measured.

At 706 a density gradient value from a look-up table (LUT) of silicon data is determined to not exceed a predetermined variation of an edge cell comprising a unit cell disposed at an edge of the high-density region. In some embodiments, the predetermined variation of the edge cell is modeled by simulation software before and after placement of one or more density gradient regions, and wherein the simulation software is recalibrated based on the silicon data.

At 708 a graded density dummy cell conforming to the density gradient value is disposed within one or more density gradient regions residing between the high-density region and a low-density region. In some embodiments, the high-density region is bordered with an identical dummy region comprising a plurality of identical dummy cells, wherein an identical dummy cell further comprises dummy physical layout topologies which are identical to physical layout topologies of the unit cell, and wherein the identical dummy region comprises the first feature density. In some embodiments, a first density gradient region is defined adjacent the identical dummy region comprising a second feature density that is approximately equal to a difference between the first feature density and the density gradient determined from the LUT. A second density gradient region is then defined adjacent the first density gradient region comprising a third feature density that is approximately equal to a difference between the second feature density and the density gradient value.

It will also be appreciated that equivalent alterations and/or modifications may occur to one of ordinary skill in the art based upon a reading and/or understanding of the specification and annexed drawings. The disclosure herein includes all such modifications and alterations and is generally not intended to be limited thereby. In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein; such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

Therefore, the present disclosure relates to an arrangement and a method of performance-aware buffer zone placement for a high-density device array of unit cells. A first feature density of the array is measured and maximum variation for a parameter within a unit cell is determined. A look-up table of silicon data is consulted to predict a buffer zone width and density gradient that achieves a variation that is less than the maximum variation for the unit cell. The look-up table contains a suite of silicon test cases of various array and buffer zone geometries, wherein variation of the parameter within a respective test structure is measured and cataloged for the various buffer zone geometries, and is also extrapolated or interpolated from the suite of silicon test cases. A buffer zone is placed at the border of the array with a width that is less than or equal to the buffer zone width.

In some embodiments, a method to define a density gradient is disclosed, the method comprising measuring a first feature density of a high-density region comprising a plurality of unit cells and measuring a cell size for a unit cell disposed within the high-density region. A density gradient value is determined from a look-up table of silicon data to not exceed a predetermined variation of an edge cell comprising a unit cell disposed at an edge of the high-density region. A graded density dummy cell conforming to the density gradient value is then disposed within one or more density gradient regions residing between the high-density region and a low-density region.

In some embodiments, a device arrangement comprising an array of unit cells further comprising a first feature density is disclosed, wherein a first region of dummy unit cells disposed at a border of the array of unit cells and comprising a region width approximately equal to a cell size of a unit cell, and wherein the first region further comprises the first feature density. A second region of first graded density dummy cells disposed at a border of the first region and comprising the region width, wherein the second region further comprises a second feature density that is less than the first feature density by approximately a density gradient value. And, a third region of second graded density dummy cells disposed at a border of the second region and comprising the region width, wherein the third region further comprises a third feature density that is less than the second feature density by approximately the density gradient value.

What is claimed is:

1. A method of assembling a layout comprising:
    measuring a first density of gate features or source/drain diffusion features within an array of unit cells with a layout tool comprising hardware;
    measuring a background density of gate features or source/drain diffusion features within background circuitry, which is arranged outside the array with the layout tool;
    determining a maximum variation for a parameter of a unit cell of the array as a function of a density gradient between the first density and the background density;
    consulting a look-up table to predict a buffer zone width that achieves a variation of the parameter that is less than the maximum variation; and
    forming a buffer zone, comprising a width that is less than or equal to the buffer zone width, between the array and the background circuitry, wherein the buffer zone further comprises a second density, which is less than the first density, and which is greater than the background density.

2. The method of claim 1, further comprising:
    defining a first region of the buffer zone to border an edge of the array and to comprise a plurality of dummy cells, wherein a dummy cell comprises dummy gate features or source/drain diffusion features which are substantially identical to gate features or source/drain diffusion features of the unit cell, but not electrically active.

3. The method of claim 2, further comprising:
    defining a second region of the buffer zone to border an edge of the first region and to have a third density, which is less than the first density, the second region comprising a plurality of first graded density dummy cells, wherein a first graded density dummy cell comprises the gate features or source/drain diffusion features of the unit cell, which are sized along their length or width by a first value.

4. The method of claim 3, further comprising:
    defining a third region of the buffer zone to border an edge of the second region and to have a fourth density, which is less than the third density, and which is greater than the background density, the third region comprising a plurality of second graded density dummy cells, wherein a second graded density dummy cell comprises the gate features or source/drain diffusion features of the unit cell, which are sized along their length or width by a second value, which is greater than the first value.

5. The method of claim 4, wherein the first or second graded density dummy cell further comprises OASIS or GDSII layout data, wherein dimensions of the gate features or the source/drain diffusion features are adjusted to produce a desired feature density.

6. The method of claim 3, wherein the second density is achieved by varying an extension of a gate feature past the source/drain diffusion feature that the gate feature intersects.

7. A method of assembling a layout, comprising:
    measuring a first feature density of an array of unit cells within a layout tool comprising hardware;
    measuring a background feature density of background circuitry which surrounds the array;
    determining a maximum variation for an electrical parameter of a unit cell of the array as a function of a density gradient between the first feature density and the background feature density;
    determining a buffer zone width of the buffer zone, that causes a variation of the electrical parameter to be less than the maximum variation; and
    disposing the buffer zone comprising a width that is less than or equal to the buffer zone width, wherein the buffer zone is arranged between the array and the background circuitry, and wherein the buffer zone has a second feature density that is less than the first feature density and greater than the background feature density.

8. The method of claim 7, wherein the maximum variation or the buffer zone width is determined by performing a circuit simulation of the array before and after disposal of the buffer zone within a layout simulation tool.

9. The method of claim 7, wherein the maximum variation or the buffer zone width is determined by consulting a look-up table comprising electrical measurements of various array and buffer zone geometries.

10. The method of claim 7, wherein the buffer zone comprises:
    a first region having the first feature density, which borders an edge of the array; and
    a second region having the second feature density less than the first feature density, which borders an edge of the first region.

11. The method of claim 10, wherein the first region comprises a plurality of dummy cells, wherein a dummy cell comprises dummy layout features that are substantially identical to layout features of the unit cell, but not electrically active.

12. The method of claim 11, wherein the second region comprises a plurality of graded density dummy cells, wherein a graded density dummy cell comprises sized layout features that are identical to the layout features of the unit cell with lengths or widths that have been systematically reduced.

13. The method of claim 12, wherein the layout features, the dummy layout features, and the sized layout features comprises a gate or source/drain diffusion.

14. The method of claim 13, wherein the second feature density is achieved by systematically varying an extension of the gate past the source or drain that the gate intersects.

15. The method of claim 12, wherein the graded density dummy cell further comprises a parameterized cell of layout features, wherein dimensions of the layout features are changed to produce a desired feature density value for the second region.

16. The method of claim 7, further comprising:
    dividing the buffer zone into a first region arranged between the array the background circuitry and a second region arranged between the first region and the background circuitry, wherein the first region has a third feature density that is greater than a fourth feature density of the second region; and
    defining a density gradient value between a the first and second regions that achieves the variation less than the maximum variation, by increasing or decreasing the third or fourth densities.

17. The method of claim 7, wherein the layout comprises graphical design data comprising OASIS, GDSII, or GL1 format.

18. The method of claim 7, wherein the first feature density, the second feature density, or the background feature density comprise a density of gate polysilicon or source/drain diffusion.

19. The method of claim 7, wherein the electrical parameter includes a current or resistance of the unit cell.

20. A method, comprising:
    detecting an array comprising a plurality of unit cells;
    measuring a first feature density of the array with a layout tool comprising hardware;
    measuring a cell size for a unit cell of the array;
    determining a maximum variation for a parameter of the unit cell of the array;
    consulting a look-up table to predict a buffer zone width that achieves a variation of the parameter that is less than the maximum variation for the unit cell;
    disposing a buffer zone comprising a width that is less than or equal to the buffer zone width; and
    segregating the buffer zone into a plurality of regions, further comprising:
        defining a first region with the first feature density, which borders an edge of the array, wherein the first region comprises a plurality of dummy cells, and wherein a dummy cell comprises dummy layout features, which are identical layout features of the unit cell, but not electrically active; and
        defining a second region with a second feature density, which borders an edge of the first region, wherein the second region comprises a plurality of first graded density dummy cells, and wherein a first graded density dummy cell comprises a first graded density layout features, which are identical to the layout features of the unit cell when is systematically sized along their length or width to achieve the second feature density, which is approximately equal to a difference between the first feature density and a density gradient value that achieves the variation that is less than the maximum variation of the parameter.

* * * * *